US008861367B2

(12) United States Patent
Gupta et al.

(10) Patent No.: US 8,861,367 B2
(45) Date of Patent: Oct. 14, 2014

(54) DELETION OF ROUTES OF ROUTING TABLES OF A WIRELESS MESH NETWORK

(75) Inventors: Mukesh Gupta, Milpitas, CA (US); Ramanagopal Vogety, Milpitas, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 1419 days.

(21) Appl. No.: 11/638,275

(22) Filed: Dec. 13, 2006

(65) Prior Publication Data

US 2008/0144587 A1 Jun. 19, 2008

(51) Int. Cl.
*H04L 12/26* (2006.01)
*H04L 12/28* (2006.01)
*H04W 40/00* (2009.01)
*H04W 40/24* (2009.01)
*H04W 84/22* (2009.01)

(52) U.S. Cl.
CPC ............ *H04W 40/248* (2013.01); *H04W 84/22* (2013.01)
USPC ........................... 370/238; 370/351; 455/445

(58) Field of Classification Search
CPC ......... H04L 45/00; H04L 45/02; H04L 45/12; H04L 45/124; H04W 40/00; H04W 40/02; H04W 40/14; H04W 40/24; H04W 40/242; H04W 40/246; H04W 40/248; H04W 40/26; H04W 40/28; H04W 40/30; H04W 40/34; H04W 84/18; H04W 84/22
USPC .............. 455/41.2, 428, 445; 370/235–238.1, 370/338, 351, 254; 709/238–244
See application file for complete search history.

(56) References Cited

U.S. PATENT DOCUMENTS

| | | | | |
|---|---|---|---|---|
| 5,088,032 | A * | 2/1992 | Bosack | 709/242 |
| 5,987,011 | A | 11/1999 | Toh | |
| 6,965,575 | B2 | 11/2005 | Srikrishna et al. | |
| 7,016,328 | B2 | 3/2006 | Chari et al. | |
| 7,058,021 | B2 | 6/2006 | Srikrishna et al. | |
| 7,061,925 | B2 | 6/2006 | Joshi | |
| 2002/0122410 | A1 | 9/2002 | Kulikov et al. | |
| 2002/0172207 | A1* | 11/2002 | Saito et al. | 370/400 |
| 2002/0175507 | A1* | 11/2002 | Kobayashi et al. | 280/735 |
| 2003/0095504 | A1* | 5/2003 | Ogier | 370/235 |
| 2004/0109472 | A1* | 6/2004 | Choyi et al. | 370/466 |
| 2004/0156345 | A1* | 8/2004 | Steer et al. | 370/338 |
| 2006/0165037 | A1* | 7/2006 | Jung et al. | 370/331 |
| 2006/0268727 | A1* | 11/2006 | Rangarajan et al. | 370/248 |

* cited by examiner

*Primary Examiner* — Michael Mapa
(74) *Attorney, Agent, or Firm* — Brian R. Short

(57) ABSTRACT

An apparatus and method of supporting peer-to-peer communication of a wireless mesh network is disclosed. The method includes a node within the wireless mesh network maintaining a routing table that indicates a first route to a client device. If the node receives a better route to the client device, the node deletes the first route, and sends a route delete to a next hop device of the first route of the client device.

8 Claims, 6 Drawing Sheets

DELETION OF ROUTES OF ROUTING TABLES OF A WIRELESS MESH NETWORK

FIELD OF THE INVENTION

The invention relates generally to wireless communications. More particularly, the invention relates to a method and apparatus for deleting routes of routing tables of nodes within mesh networks.

BACKGROUND OF THE INVENTION

Wireless mesh networks are gaining popularity because wireless infrastructures are typically easier and less expensive to deploy than wired networks. The wireless mesh networks typically include wired gateways that are wirelessly connected to wireless nodes, or wirelessly connected directly to client devices. Many wireless nodes can collectively provide a wireless mesh, in which client devices can associate with any of the wireless nodes.

Routing paths can be selected between the nodes of the mesh network according to one or more of many possible routing selection procedures. The routing paths provide a path for data flow between a client device associated with the wireless mesh network and a gateway of the mesh network. The gateway can be wire connected to a wired network which is connected, for example, to the internet. Due to the possibility of changing locations of the wireless nodes, and due to the typically changing link qualities of wireless connections, the best quality routing path available can vary with time. Additionally, wireless clients typically roam from one wireless node to another wireless node.

Peer-to-peer (that is, client device to client device communication within the wireless network) communications requires additional requirements of the mesh network. That is, client devices can communicate with each others through the mesh network as peers. This peer-to-peer communication puts additional demands on the routing through wireless mesh networks.

It is desirable to have a method and apparatus for operating a wireless network that can accommodate for client devices and wireless nodes that roam within the wireless network, and accommodates peer-to-peer communications.

SUMMARY OF THE INVENTION

One embodiment of the invention includes a method of supporting peer-to-peer communication of a wireless mesh network. The method includes a node within the wireless mesh network maintaining a routing table that indicates a first route to a client device. If the node receives a better route to the client device, deletes the first route and node sends a route delete to a next hop device of the first route of the client device.

A second embodiment includes another method of supporting peer-to-peer communication of a wireless mesh network. This method also includes a node within the wireless mesh network maintaining a routing table that indicates a first route to a client device. If the node receives a route delete from an upstream device to the client device, the node deletes the first route, and the node sends a route delete to a next hop device of the first route of the client device.

A third embodiment includes another method of a wireless mesh network supporting peer-to-peer communication. The method includes a first node within the wireless mesh network maintaining a routing table that indicates a first route to a client device. When the client device associates with a second node within the wireless mesh network, the second node updates its routing table with a second route to the client device. Each device upstream in a path from the second node to a default gateway of the second node, updates its routing table with the second route, and the default gateway of the second node broadcasts a route to the client device.

Other aspects and advantages of the present invention will become apparent from the following detailed description, taken in conjunction with the accompanying drawings, illustrating by way of example the principles of the invention.

DETAILED DESCRIPTION

Figure 1:
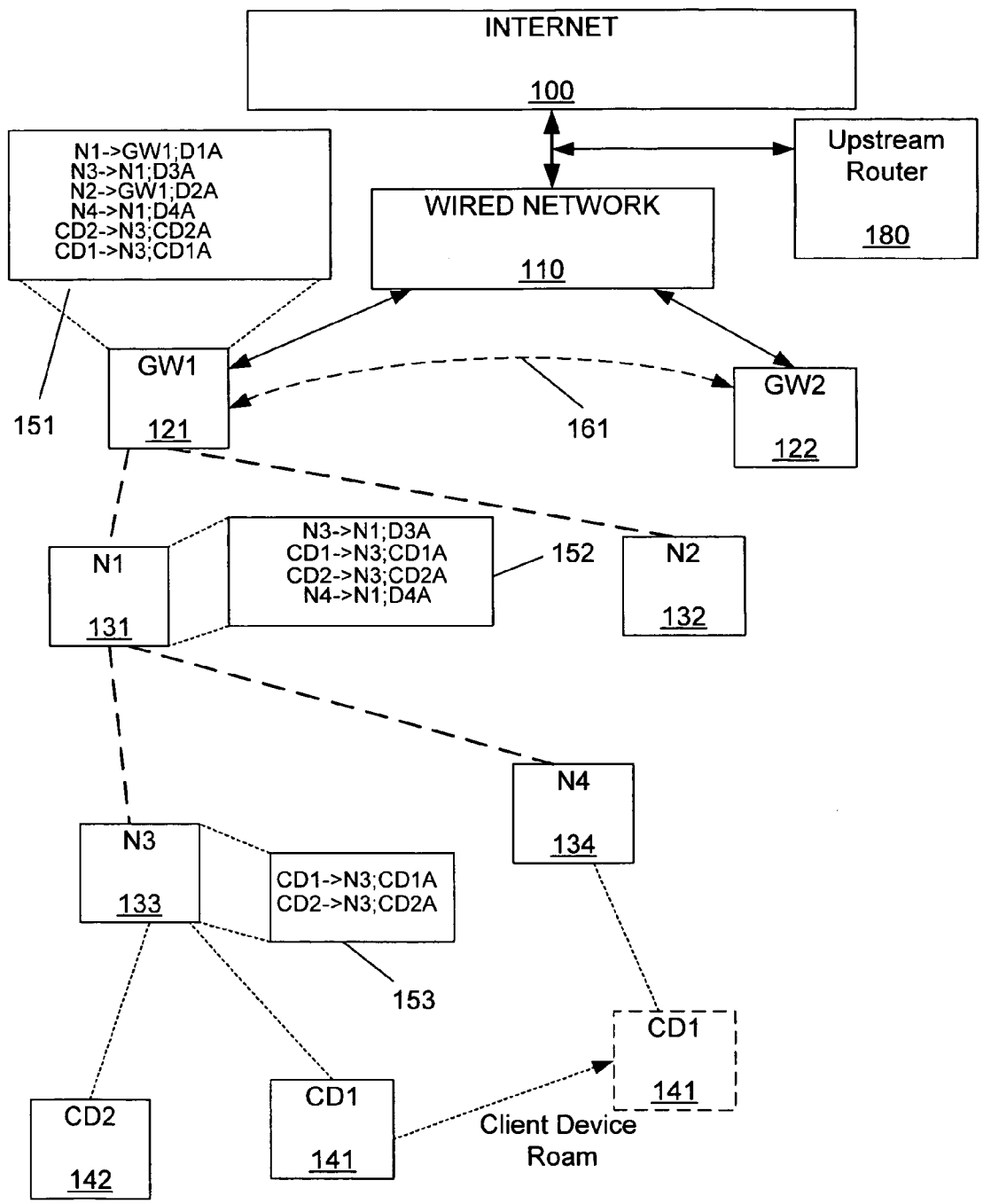
FIG. 1 shows a wireless network that includes a client device roaming from a first access node to a second access node of the wireless network, wherein the first and second access nodes share a common upstream access node.

As shown in the drawings for purposes of illustration, the invention is embodied in an apparatus and method of a wireless network that accommodates for client devices of the wireless network that roam within the wireless network.

FIG. 1 shows a wireless network that includes a client device roaming from a first access node to a second access node of the wireless network, wherein the first and second access nodes share a common upstream access node. The network of FIG. 1 includes gateways 121, 122, wireless access nodes 131, 132, 133, 134 and client devices 141, 142. The gateways 121, 122 and the access nodes 131, 132, 133, 134 together form a wireless mesh that the client devices 141, 142 can associate with, obtaining wireless access to the mesh network, and therefore, access to the wired network 110, and the internet 100. The following description includes wireless mesh networks, but it is to be understood that the embodiments described can be used within wireless networks that contain only wireless access points, and therefore, are not truly wireless mesh networks.

The gateways 121, 122 are typically connected to the wired network 110 through a high-bandwidth connection that can be a wired or wireless connection. The access nodes 131, 132, 133, 134 are generally wirelessly connected forming a wireless mesh network. The wireless connections can vary, and are determined by a routing selection protocol.

One routing protocol includes each of the gateways 121, 122 originating routing beacons at a predetermined rate. The access nodes (generally referred to as first-level access nodes) receive the routing beacons and select the gateway that provides the best quality link based on a persistence of routing beacons received. The selected gateway becomes a default gateway. The gateways then re-broadcast the routing beacons that were received, after modifying the routing beacons with additional information. The additional information can include, for example, the address of the access node and/or a hop-count indicator (hop-count indicates the number of wireless hops the access node is from a routing beacon originating gateway). The next access nodes (generally referred to as second-level access nodes) receive the re-broadcast routing beacons, and select an upstream access node that provides the best quality link based on a persistence of the re-broadcast routing beacons received.

The selected routing paths are conveyed to all upstream devices. Upstream devices are either the default gateway, or an access node in a routing path to the default gateway. The selected routing paths are stored within each device so that each device knows how to route data to and from client devices.

Routine Tables

An embodiment includes each device (gateways and access nodes) storing a routing table that includes all devices (access nodes and client devices) that route through the device. For example, in FIG. 1, a routing table 151 is stored within the gateway 121. The first entry of the routing table 151 shows that the first access node 131 routes through the first gateway 121. The second entry shows that the third access node 133 routes through the first access node 131. The third entry shows that the second access node 132 routes through the first gateway 121. The fourth entry shows the fourth access node 134 routes through the first access node 131. The fifth entry shows the first client device 141 is associated with third access node 133. The sixth entry shows that the second client device 142 is also associated with the third access node 133. The order of the entries as shown and described is purely arbitrary, and is for purposes of illustration only.

The first access node 131 includes a routing table 152 that includes entries containing routing information that depicts the third access node 133 routes through the first access node 131, the fourth access node 134 routes through the first access node 131, and that the first and second client devices 141, 142 are associated with the third access node 133.

The third access node 133 includes a routing table 153 that includes entries containing routing information that depicts the first and second client devices 141, 142 are associated with the third access node 133.

The routing tables provide each device with the information required to route data to and from the client devices. The client devices 141, 142 communicate with devices connected to the wired network 110, or connected to the internet through the corresponding gateway and intermediate access nodes. The routing tables allow the gateways and access nodes to properly route the data traffic.

The node of the wireless network that has a client device attached can be referred to as a leaf node. For example, the node 133 has client devices 141, 142 attached to it. Therefore, the node 133 is a leaf node. An embodiment includes the third node 133 sending a route update to its upstream node (the first node 131) once every predetermined amount of time (for example, once every one second). The leaf node (third node) 133 also transmits a client detection probe (such as, ARP (address resolution protocol)) to the client devices 141, 142 every period of time (such as, once every three seconds) to check if the client device(s) are still attached to it. If the client device is still attached a link to the client device is included within a route update to an upstream device by the leaf node.

The gateways 121, 122 can communicate the client device ages, devices ages and age at next hop (described later) to each other. This communication can be in the form of wireless broadcast links 161, 162, or this communication can occur through the wired network 110. As will be described, the gateways 121, 122 can broadcast and uni-cast routes to client devices.

GARPS

An upstream router 180 receives GARPS (Gratuitous Address Resolution Protocol) from the gateways 121, 122 so that the upstream router 180 knows how to route data traffic through the gateways, to the corresponding client devices. For example, the first gateway 121 sends a GARP to the upstream gateway 180 when the first gateway 121 receives a route update for the first client device 141 so that the upstream router 180 routes data traffic to the first client device 141 through the first gateway 121.

Client Device Roaming

The information within the routing tables can become inaccurate when the client devices roam from one node to another node (access node or gateway) within the wireless network. For example, FIG. 1 shows a roaming scenario in which a client device roams from one access node (the third access node 133) to another access node (the fourth access node 134) of the wireless network, wherein the access nodes share a common upstream access node (the first access node 131). When a client device roams from one access node to another, the routing tables are updated to reflect that the new routing path between the client device and the new (could be the same) gateway.

Client Device Aging

As shown in FIG. 1, the routing tables 151, 152, 153 can additionally include a client device age. The client device age indicates how long or how recently a client device has been associated with a node of the wireless network. An upstream device that receives a route update having a more recent client age, updates its routing table with the route having the more recent client age. The client device ages are shown, for example, in FIG. 1. The first client device 141 age is depicted in the routing tables 151, 152, 153 as CD1A. The second client device 142 age is depicted in the routing tables 151, 152, 153 as CD2A.

Routing Table updates Based on Client Age

The ages of the client devices can be used to maintain the entries of the routing tables. For example, if the client device 142 roams from the third access node 133 to the fourth access node 134, the routing tables of the first gateway 121 and the first access node 131 need to be updated. That is, for example, the first gateway 121 updates its routing table to reflect that the client device 142 is associated with the fourth access node 132 because the client device age CD2A of the fourth access node 134 is more recent than the client device age CD1A provided by the third access node 133.

The first access node 131 also updates its routing table to reflect that the first client device (CD1) 142 is associated with the fourth access node 134, and the routing table of the first access node 132 includes an age (CD1A) of the first client device 141.

The routing tables are generally updated with the most recent client device age. However, as will be described, certain other aging parameters can over-ride the client device age. For example, an age at next hop can in some situations over-ride the client device age.

Device Aging

In addition to client device ages, access node can also provide an age that reflects when the access node associated with the upstream device. The age of a device (access node) is determined by when the access node selected the present route to a gateway. For example, the routing tables 151, 152, 153 depict a device age for the third access node 133 as D3A. Again, the device age is determined by when, for example, the third access node 133 selected its present routing path to the first gateway 121. The routing table tables depict a device age of the first access node 131 as D1A, the device age of the second access node 132 as D2A, and the age of the fourth access node 134 as D4A.

Routing Table updates Based on Device Age

The ages of the devices (access nodes) can be used to maintain the entries of the routing tables. For example, if the third access node 133 roams from the first access node 131 to the second access node 132, the routing tables of the first gateway 121 and the second access node 132 need to be updated. That is, for example, the first gateway 121 updates its routing table to reflect that the third access node 133 routes through the second access node 132 because the device age D3A of the second access node 132 is more recent than the device age D3A provided by the first access node 131.

The second access node 132 also updates its routing table to reflect that the third access node 133 routes through the second access node 132, and the routing table of the second access node 132 includes an age (D3A) of the third access node 133.

Age at Next Hop

The age at next hop depicts the time since a next hop has had a route update. Stated differently, the age at next hop indicates when a next wireless hop router updated its routing table. Generally, a next hop router is a device that is one wireless hop downstream from the present device. The age at next hop can also be used for selecting routes.

The routing table 151 of the first gateway 121 includes an age at next hop (not shown) for the first access node 131 that indicates when the first access node 131 most recently updated its routing table. The routing table 151 also includes an age at next hop for the third access node 133, an age at next hop for the fourth access node 133, an age at next hop for the first client device 141, and an age at next hop for the second client device 142. The routing table 152 of the first access node includes an age at next hop for the third access node 133 that indicates when the third access node 133 most recently updated its routing table, an age at next hop for the first client device 141, and an age at next hop for the second client device 142. As will be described, the age at next hop for entries within the routing tables can also be used for properly maintaining the entries of the routing table.

Updating Routing Tables Based on Age at Next Hop

Generally, each gateway and access node updates its routing table with the most recent age at next hop. If, for example, the third access node 133 roams to the second access node 132, the age at next hop of the first access node 131 is updated. The age at next hop is useful in maintaining routing of traffic when access nodes roam.

When the third access node 133 roams from the first access node 131 to the second access node 132, the routing table of the second access node 132 is updated to include the third access node 133, along with the device age D3A (reflecting when the third access node 133 selected the route with the second access node 132 as its upstream device). Due to the update of the routing table of the second access node 132, the routing table of the first gateway is updated with the new route of the third access node 133, but also the age at next hop of the second access node 132. The age at next hop can in some situation over-ride the client device age in determining how to update the routing tables.

Peer-to-Peer Communications

The client devices 141, 142 can communicate (peer-to-peer communication) with each other through the third access node 133. The routing table of the third access node 133 includes both client devices 141, 142, so the third access node 133 knows how to route data between the client devices 141, 142.

As previously described, the routing tables of the fourth access node 134, the first access node 131 and the first gateway 121 are updated with the first client device 141 roams from third access node 133 to the fourth access node 134. As previously described, the route updates are based upon the client device age and the age at next hop.

However, the second client device 142 is still associated with the third access node 133, and unless updated, the routing table of the third access node 133 still includes a route entry for the first client device 141. Therefore, peer-to-peer client device communications between the first client device 141 and the second client device 142 is interrupted.

An embodiment of a method of providing peer-to-peer communication between client devices of a wireless mesh network includes the access nodes sending route deletes when a better route to a client device is received. A better route can be determined by the client device age, device age and age at next hop, as has been described. For example, when the first client device 141 roams to the fourth access node 134, the first access node 131 receives a route update for the first client device 141. The first access node 131 updates the route with the route update because the new route is better than the old route (as can be determined by client device age, device age and/or age at next hop). An embodiment of this method includes the first access node 131 also sending a route delete to the third access node 133 upon deleting the old route. The third access node 133 then deletes the route to the first client device 141. Therefore, communication between the first client device 141 and the second client device 142 can continue through the first access node 131, as communication progresses upstream through the third access node 133, per the updated routes.

Figure 2:
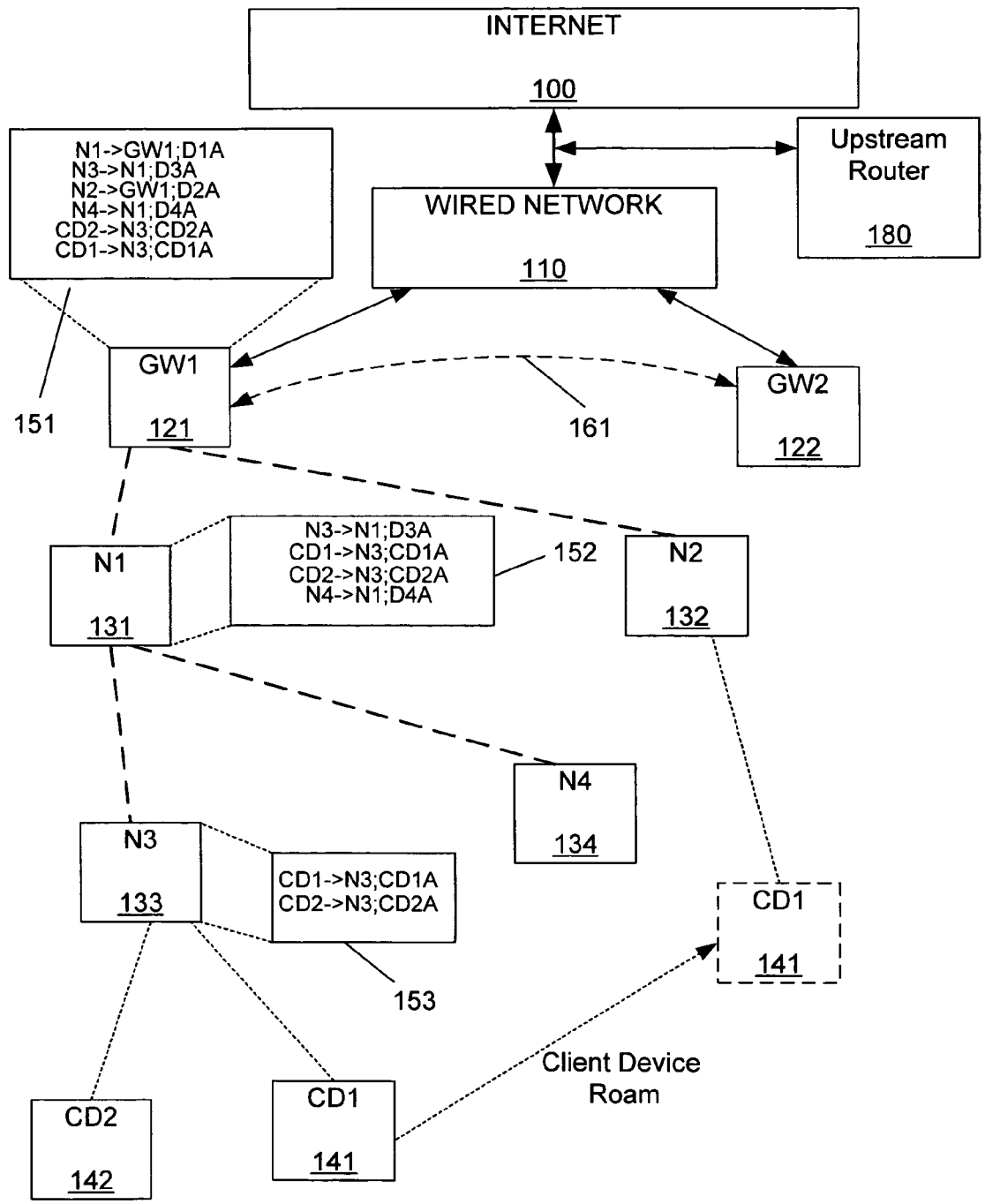
FIG. 2 shows a wireless network that includes a client device roaming from a first access node to a second access node of the wireless network, wherein the first and second access nodes share a common upstream gateway, but do not share an upstream access node.

FIG. 2 shows a wireless network that includes a client device roaming from a one access node to another access node of the wireless network, wherein the access nodes share a common upstream gateway, but do not share an upstream access node. As shown in FIG. 2, the first client device 141 roams from the third access node 133 to the second access node 132. Here, the third access node 133 and the second access node 132 share a common gateway 121, but do not share any upstream access nodes.

When the first client device 141 roams to the second access node 132, the routing tables of the second access node 132 and the first gateway 121 are updated based on the client device age and the age at next hop. However, unless updated, the routing tables of the first access node 131 and the third access node 133 maintain the route to the first client device 141. Therefore, peer-to-peer communication between the first client device 141 and the second client device 142 can be interrupted.

An embodiment of the method of maintaining peer-to-peer communication within a wireless network includes the gateway 121 sending a route delete to access nodes of a route that is being deleted because a better route has been received. That is, when the gateway 121 updates the route to the first client device 141 because the gateway 121 receives a better route to the first client device 141 from the access node 132, the gateway 121 sends a route delete to the access node 131. The access node 131 then propagates the route delete to the first client device 141 to the access node 133. Thereafter, peer-to-peer communication between the first client device 141 and the second client device 142 is routed through the gateway 121.

Anytime a gateway updates its route to a client device, the gateway sends a GARP to an upstream router, such as through the upstream router 180.

Figure 3:
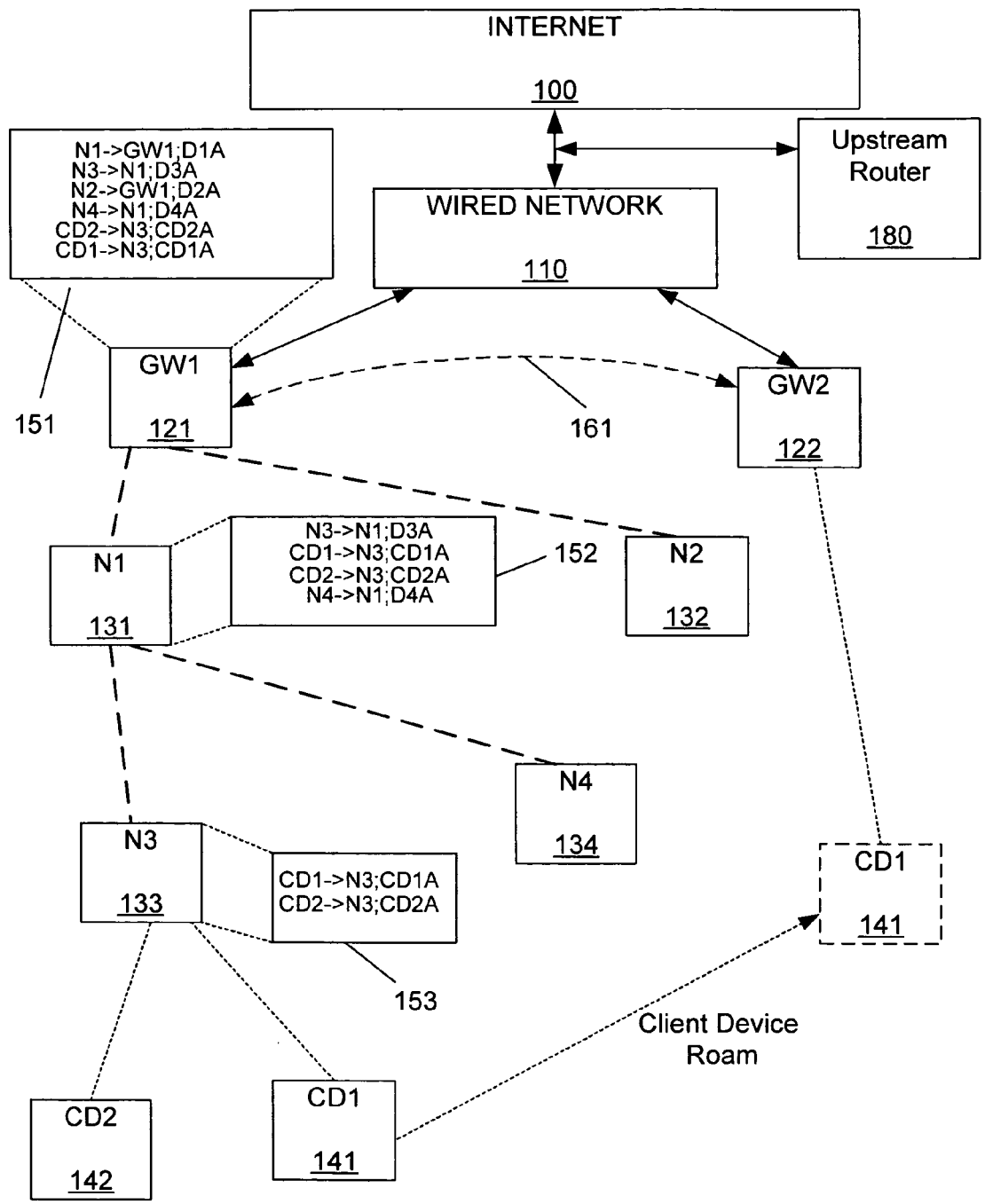
FIG. 3 shows a wireless network that includes a client device roaming from a first access node to a second access node of the wireless network, wherein the first and second access nodes do not share a common gateway.

FIG. 3 shows a wireless network that includes a client device roaming from a one access node to another access node of the wireless network, wherein the access nodes do not share a common gateway. As shown in FIG. 3, the first client device 141 roams from the first gateway 121 (through the third access node 133 and the first access node 131) to the second gateway 122. Therefore, unless the routing tables of the first and third access nodes 131, 133 and the gateway 121 are updated, peer-to-peer communication between the first client device 141 and the second client device 142 is interrupted.

An embodiment of the method of maintaining peer-to-peer communication of a wireless network includes gateways broadcasting a route to a client device when the gateway adds or updates a route to the client device. As will be described, an additional embodiment includes other gateways receiving the broadcast and deleting a route to the client device if the route to the client device of the broadcast is better than the route to the client device of the receiving gateway.

For example, when the gateway 122 updates its routing table with the route to the first client device 141, the gateway broadcasts the new route. The gateway 121 receives the broadcast, and deleted its route because the route broadcast by the gateway 122 is better, as determined by the client device age CD1. Once the gateway 121 deletes its route to the first client device, the gateway sends a route delete to the access node 131, which sends a route delete to the access node 133. Again, anytime a gateway updates its route to a client device, the gateway sends a GARP to the upstream router 180.

Figure 4:
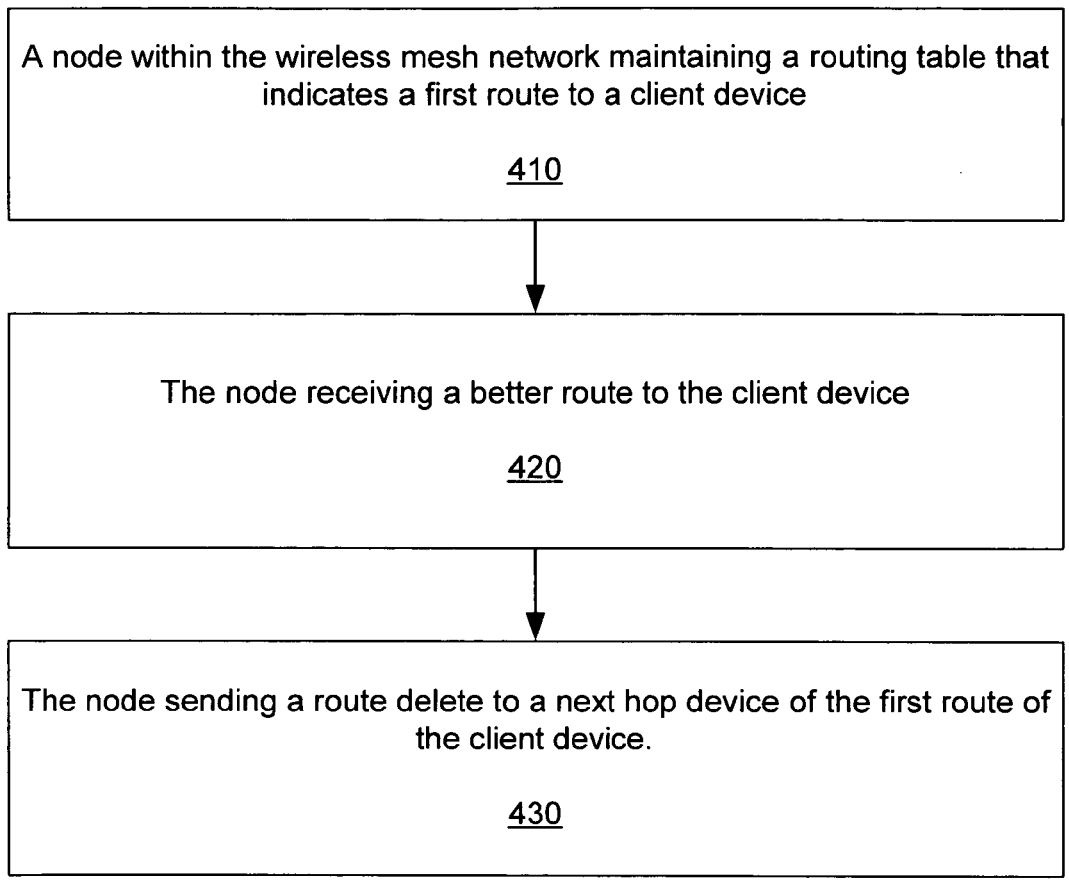
FIG. 4 is a flow chart that shows steps of a method of a client device roaming during peer-to-peer communications.

FIG. 4 is a flow chart that shows steps of a method of a client device roaming during peer-to-peer communications. A first step 410 of the method includes a node within the wireless mesh network maintaining a routing table that indicates a first route to a client device. A second step 420 includes the node receiving a better route to the client device. A third step 430 includes the node sending a route delete to a next hop device of the first route of the client device.

When the node receives a route delete from an upstream device, the node deletes the route corresponding with the route delete. The node then forwards the route delete to another next hop device of the old (the route being deleted) route. The next hop device deletes the route, and the forwards the route delete as well, unless the next hop device is a leaf node that was connected to the client device. However, if the route delete was received from a device that is not a present upstream device, the node ignores the route delete.

The nodes can be access nodes or gateways of a mesh network. Embodiments of the gateways can broadcasts existence of the better route. Additionally, an embodiment of the gateway sends a GARP to an upstream router, providing the upstream router with routes to the client devices. If the gateway receives a broadcast from a different gateway that includes a different route to the client device, and the first route (between the gateway and the client device) is better than the different route, then the gateway maintains the first route. Additionally, if the first route is better than the received broadcast route, the gateway uni-casts a route delete to the different gateway.

If the gateway receives a broadcast from a different gateway that includes a different route to the client device, and the first route is worse than the different route, then the gateway deletes the first route. The gateway then propagates the route delete to downstream devices of the route being deleted. One embodiment includes the route delete including a plurality of routes. For another embodiment, the route delete includes a route delete that deletes all downstream route associated with the node delete.

Figure 5:
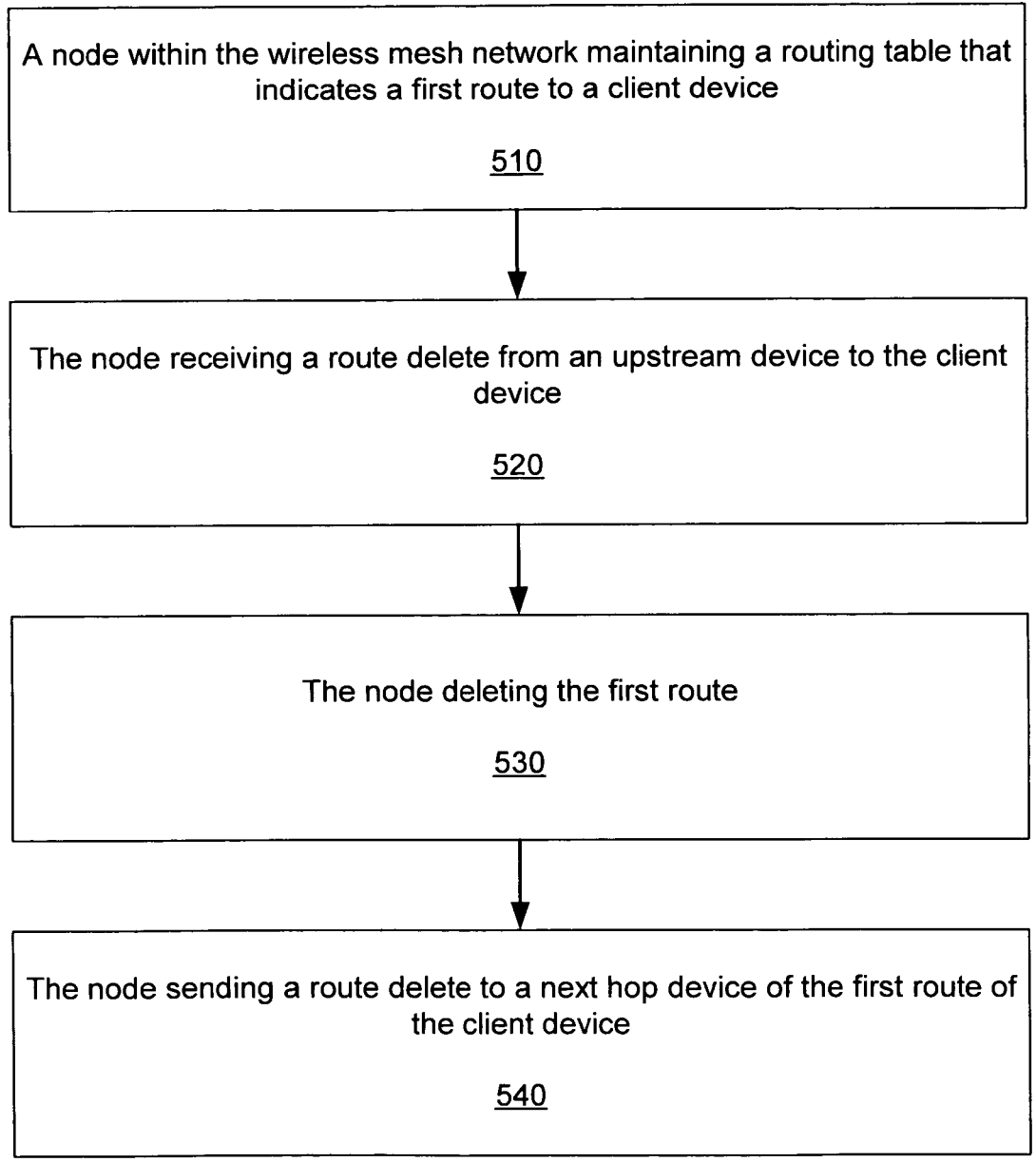
FIG. 5 is a flow chart that shows steps of another method of a client device roaming during peer-to-peer communications.

FIG. 5 is a flow chart that shows steps of another method of a client device roaming during peer-to-peer communications. A first step 510 includes a node within the wireless mesh network maintaining a routing table that indicates a first route to a client device. A second step 520 includes the node receiving a route delete from an upstream device to the client device. A third step 530 includes the node deleting the first route. A fourth step 540 includes the node sending a route delete to a next hop device of the first route of the client device.

The route deletes are propagated through the old (first) route until the leaf node is reached. One embodiment includes the route delete including a plurality of routes. For another embodiment, the route delete includes a route delete that deletes all downstream route associated with the node delete.

Figure 6:
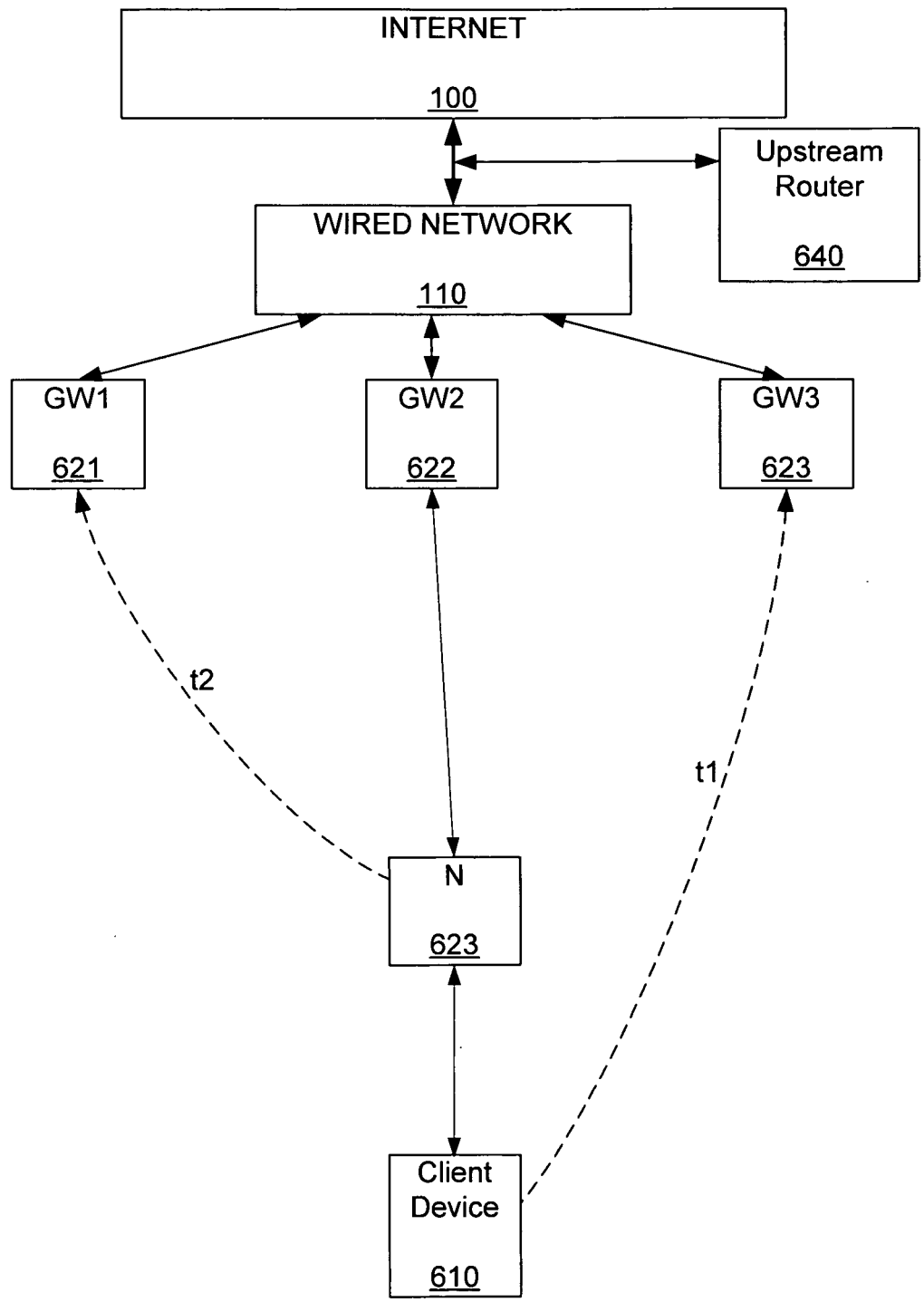
FIG. 6 shows a client device and an access node roaming between gateways of a wireless network.

FIG. 6 shows a client device roaming between gateways of a wireless network. Embodiments of the peer-to-peer communication include gateways broadcasting new routes to other gateways of the network. Additionally, if a first gateway receives a route through a broadcast, and the first gateway determines that it has a better quality route to the client device, the first gateway uni-casts to the broadcasting gateway that the first gateway has a better route to the client device.

For example, FIG. 6 shows a client device 610 initially associated with an access node 623, which is connected to a second gateway 622. A first roam (marked t1) includes the client device 610 roaming from the access node 623 to a third gateway 623. According to the previously described methods, the routing table of the third gateway 623 is updated indicating the new route to the client device 610. A next event includes the access node 623 roaming to a first gateway 621. However, if the routing table of the access node 623 has not yet been updated, the first gateway 621 receives a route update from the access node 621 indicating a route to the client device 610. Therefore, both the first gateway 621 and the third gateway 623 can be fooled into thinking they have routes to the client device 610, and will both send GARPs to an upstream router 640, clearly creating a problem. This situation is overcome by the gateways broadcasting their new routes so that the other gateways are aware. Here, for example, the third gateway 623 will receive the route broadcast from the first gateway. The third gateway 623 will determine that it has a better route based on client device age. The third gateway 623 will then uni-cast back to the first gateway indicating that the third gateway 623 has a better route. The first gateway 621 will receive the uni-cast, and delete its route to the client device 610. Then first gateway 621 also sends a route deleted to the access node 623. The third access node 623 sends a GARP to the upstream router 640 with the correct route to the client device 610.

The methods of controlling client mobility can be implemented as software that operates on a gateway and/or access node of a wireless network. If implemented in software, the software runs on a processor of the node (gateway or access) controlling the node according to the embodiment described.

Wireless mesh networks can be implemented that include large number of gateways and access node that each include the methods of operating a router as has been described.

Although specific embodiments of the invention have been described and illustrated, the invention is not to be limited to the specific forms or arrangements of parts so described and illustrated. The invention is limited only by the appended claims.

What is claimed:

1. A method of supporting peer-to-peer communication of a wireless mesh network, comprising: a node within the wireless mesh network maintaining a routing table that indicates a first route to a client device; the node receiving a different route to the client device; the node determining whether the different route is better or worse than the first route based on a client device age, a device age and an age at next hop, wherein the client device age indicates how long the client device has been associated with at least one access node of the wireless mesh network, the device age indicates when a downstream access node selected a route to the node, and the age at next hop indicates a time since a next wireless hop downstream device updated its routing table; the node deleting the first route to the client device after the node determines the different route is better than the first route; the node sending a route delete to the next wireless hop downstream device of the first route of the client device after the node determines the different route is better than the first route; determining whether the node is a gateway of the wireless mesh network and wherein when the node is determined to be a gateway of the wireless mesh network and determines the different route is better than the first route, the node broadcasting existence of a different route to other gateways of the wireless mesh network, the node sending a Gratuitous Address Resolution Protocol (GARP) to an upstream router that routes to the client device, and the node uni-casting a route delete to the other gateways.

2. The method of claim 1, further comprising the node receiving a route delete from an upstream device, and deleting the route corresponding with the route delete.

3. The method of claim 2, wherein the next hop device forwards the route delete as well, unless the next hop device is a leaf node that was connected to the client device.

4. The method of claim 3, wherein when the route delete was received from a device that is not a present upstream device, the node ignores the route delete.

5. The method of claim 1, wherein the route delete comprises a plurality of routes.

6. A method of a wireless mesh network supporting peer-to-peer communication, comprising: a first node within the wireless mesh network maintaining a routing table that indicates a first route to a client device; the client device associating with a second node within the wireless mesh network; the second node updating its routing table with a second route to the client device; each node upstream in a path from the second node to a default gateway of the second node, updating its routing table with the second route; the default gateway of the second node broadcasting a route to the client device; wherein each node located within a route between the default gateway of the first node and a previous leaf node of the client device deletes the route to the client device; determining whether the first node is a common ancestor node, wherein when the first node is a common ancestor node, the method further comprises: the first node receiving a different route to the client device; the first node determining whether the different route is better or worse than the first route based on a client device age, a device age and an age at next hop, wherein the client device age indicates how long the client device has been associated with at least one access node of the wireless mesh network, the device age indicates when a downstream access node selected a route to the node, and the age at next hop indicates a time since a next wireless hop downstream device updated its routing table; the first node deleting the first route to the client device after the node determines the different route is better than the first route; the first node sending a route delete to the next wireless hop downstream device of the first route of the client device, wherein the next hop downstream device is downstream from the first node after the node determines the different route is better than the first route.

7. The method of claim 6, further comprising:
a default gateway of the first node receiving the broadcast from the default gateway of the second node;
the default gateway of the first node sending a route delete in a downstream path towards the first node.

8. The method of claim 6, wherein when the first node is not a common ancestor node, the method further comprises:
the first node receiving a route delete from an upstream device; the first node deleting a route corresponding with the route delete; the first node forwarding the route delete to another next hop device.

* * * * *